March 13, 1962   J. E. HUGGINS, JR   3,024,878
CONNECTOR BRACKET
Filed March 11, 1959
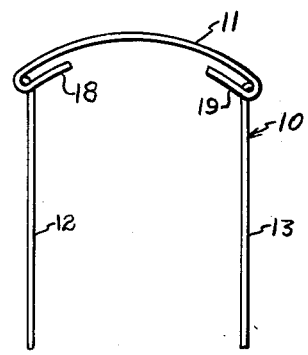
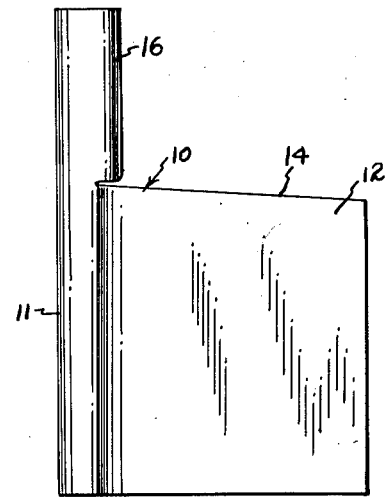
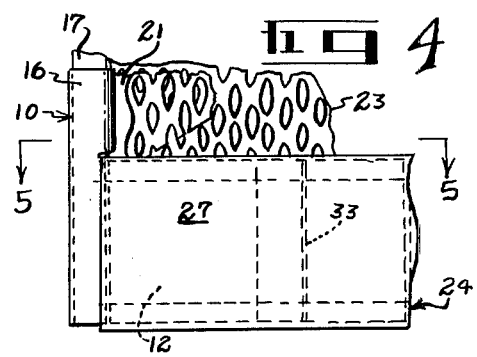
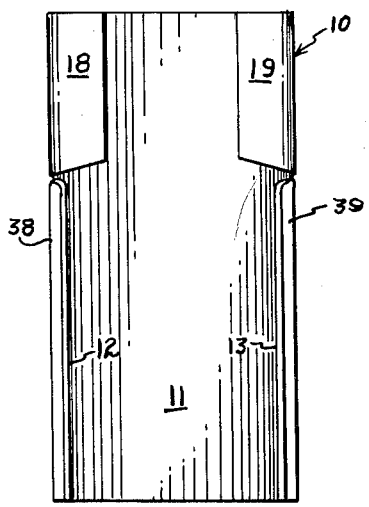
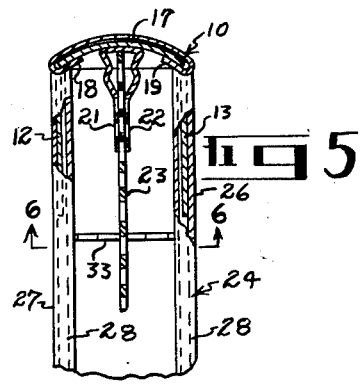
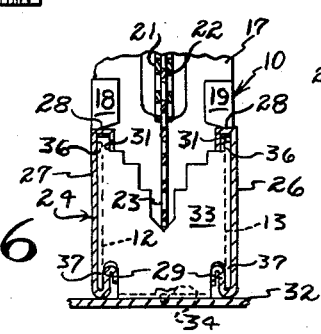
INVENTOR.
James E. Huggins Jr.
BY Jennings, Carter & Thompson
Attorneys 3,024,878
CONNECTOR BRACKET
James E. Huggins, Jr., 514 N. 75th St., Birmingham, Ala.
Filed Mar. 11, 1959, Ser. No. 798,775
7 Claims. (Cl. 189—36)

This invention relates to a connector bracket and more particularly to a bracket for connecting a vertical cap bead and the like to a base member in a building construction.

An object of my invention is to provide a bracket for connecting a vertical bead to a base member in a building construction in which the bead is held firmly in alignment with the base member after installation thereof whereby the bead does not move or shift relative to the base member prior to anchoring the bead to the base member by plaster and the like.

Another object of my invention is to provide a connector bracket of the character designated which may be installed accurately by unskilled labor and in a minimum of time, thereby reducing materially the overall cost of the building construction.

A further object of my invention is to provide a connector bracket of the character designated which is sturdy of construction and neat in appearance.

A still further object of my invention is to provide a connector bracket of the character designated which shall be simple of construction, economical of manufacture and one which may be employed with conventional type vertical beads and base members in building constructions.

Heretofore in the art to which my invention relates, vertical beads have been assembled relative to the base member by placing the lower end of the bead adjacent the end of the base member. The bead is thus positioned whereby it is free to shift or roll relative to the adjacent end of the base member. Accordingly, the bead is often knocked out of alignment before the plaster has set, thereby causing the finished construction to have improperly aligned members.

A connector bracket embodying features of my invention is illustrated in the accompanying drawing, forming a part of this application, in which:

FIG. 1 is a plan view of the bracket;

FIG. 2 is a side elevational view;

FIG. 3 is a rear elevational view;

FIG. 4 is a fragmental view, drawn to a smaller scale, showing the connector bracket connecting a vertical bead to a base member;

FIG. 5 is a sectional view taken generally along the line 5—5 of FIG. 4 with portions of the base member broken away; and, FIG. 6 is a sectional view taken generally along the line 6—6 of FIG. 5.

Referring now to the drawing for a better understanding of my invention, I show my connector bracket generally at 10. As shown in FIG. 1, the connector bracket 10 is substantially U-shaped, as viewed in plan and comprises a base section 11 which is connected to laterally extending leg members 12 and 13. The upper edges of the side members 12 and 13 are tapered toward the free ends thereof, as shown at 14, for a purpose to be described hereinafter.

Extending upwardly from the base 11 of the connector bracket 10 is an extension 16 which may be an integral part of the base section 11 of the connector bracket. However, the extension 16 may be formed separately and secured to the remainder of the connector bracket 10 by suitable means. As shown in FIGS. 1 and 5, the extension 16 is arcuate, as viewed in cross section, whereby it corresponds generally to the arcuate cross section of the vertical bead indicated at 17. However, if the vertical bead 17 is of another shape the extension 16 would correspond generally to that shape. Preferably, the base 11 of the U-shaped bracket 10 is formed integrally with the extension 16 and the entire base section 11 and extension 16 are of the same cross sectional shape, as clearly shown in FIGS. 1 and 5. The side portions of the extension 16 are bent inwardly to provide inwardly extending flanges 18 and 19 which are disposed to engage the inner surface of the vertical bead 17, when it is inserted between the inturned flanges 18 and 19 and the remainder of the extension 16, as shown in FIG. 5.

As shown in FIGS. 4 and 5, the central portion of the bead 17 is secured to inwardly extending lath members 21 and 22 positioned at opposite sides of a vertical lath member 23 which forms a supporting surface for plaster and the like. The lath members 21 and 22 are secured to the vertical lath member 23 by suitable means after the connector bracket 10 is installed.

The base member for the building construction, indicated generally at 24 comprises a pair of conventional type side members 26 and 27 having inwardly and downwardly extending flanges 28 at the tops thereof and inwardly and upwardly extending flanges 29 at the bottoms thereof which define longitudinally extending grooves 31. The side members 26 and 27 are connected to a suitable supporting base, such as a floor 32, by conventional type vertical brackets 33 in a manner well known in the art. The vertical bracket 33 is secured to the support 32 by suitable means, such as a screw 34. The vertical bracket 33 is provided with upwardly extending side members 36 at the upper sides thereof which engage the outwardly and inwardly extending flanges 28 and is provided with downwardly extending members 37 at the lower sides thereof which are disposed to engage the grooves defined by the inwardly and upwardly extending flanges 29. In view of the fact that the vertical brackets 33 are conventional and form no part of my invention, no further description thereof is deemed necessary.

As shown in FIGS. 1 and 3, the juncture of the side members 12 and 13 with the base 11 of the connector bracket 10 is offset inwardly as at 38 and 39 whereby upon inserting the side members 12 and 13 in the longitudinally extending grooves 31 of the base member 24, the outer edges of the connector bracket 10 are even with the outer surfaces of the side members 26 and 27, as shown in FIG. 5. That is, the ends of the side members 26 and 27 of the base member 24 engage the offset portions 38 and 39 whereby the sides 26 and 27 of the base member 24 are even with the sides of the connector bracket 10.

While I have shown the side members 12 and 13 as being relatively flat it will be apparent that the side members could have offset portions as corrugations therein to provide a more snug fit between the connector bracket and the base member.

In operation, the side members 12 and 13 of the connector bracket 10 are inserted in the grooves 31 defined in the side members 26 and 27. In view of the fact that the upper edges of the side members 12 and 13 taper toward the free ends thereof, insertion of the side members 12 and 13 into the grooves 31 is facilitated and at the same time a snug fit is provided between the side members and the base member 24. With the side members 12 and 13 within the grooves 31, the adjacent ends of the side members 26 and 27 engage the offset portions 38 and 39 of the connector bracket 10 whereby a smooth and even joint is provided between the connector bracket 10 and the base member 24. With the connector bracket 10 thus secured to the base member 24, the lower end of the vertical bead 17 is inserted between the extension 16 and the inturned flanges 18 and 19 carried thereby, whereby the bead 17 is attached to the connector bracket. With the bead 17 in position, the lath members 21 and 22 are secured to the vertical lath member 23 by suitable means, such as wire or the like. Plaster is then applied to the metal lath members 21, 22 and 23 and the interior of the base member 24 in the usual manner.

While I have described the connector bracket 10 as being first connected to the base member 24 prior to connection to the vertical bead 17, it will be apparent that the bead 17 could be first connected to the extension 16 and then the side members 12 and 13 could be inserted in the grooves 31 provided in the side members 26 and 27 of the base member 24.

From the foregoing, it will be seen that I have devised an improved connector bracket for connecting a bead to a base member in a building construction. By providing means for holding the bead firmly in contact with the adjacent base member prior to the application of plaster, the bead is held accurately in position, thus preventing misalignment of the bead relative to the members connected thereto. Also, by attaching the bead to the connector bracket, and in turn connecting the connector bracket to the base member, a sturdy construction is provided which adds materially to the overall strength of the structure.

While I have shown my invention in but one form, it will be obvious to those skilled in the art that it is not so limited but is susceptible of various changes and modifications without departing from the spirit thereof, and I desire, therefore, that only such limitations be placed thereupon as are specifically set forth in the appended claims.

What I claim is:

1. A building construction comprising an elongated base member having longitudinally extending grooves therein, a generally U-shaped bracket having a base portion connected to laterally extending leg members, said leg members being of a size and shape to telescope into said longitudinally extending grooves in said base member, an elongated bead, the cross sectional shape of said base portion of the U-shaped bracket corresponding generally to the shape of one side of said bead whereby said one side of the bead is in engagement with said base portion of the U-shaped bracket, and inwardly extending retaining members carried by said U-shaped bracket in position to engage the other side of said bead whereby said bead is attached to said U-shaped bracket.

2. A building construction as defined in claim 1 in which the retaining members carried by the U-shaped bracket comprise inturned flanges formed integrally with said U-shaped bracket.

3. A building construction as defined in claim 1 in which the laterally extending leg members extend generally parallel to each other.

4. A building construction as defined in claim 1 in which at least one edge of each of the leg members is tapered toward the free end thereof to facilitate insertion into the longitudinally extending grooves and to provide a snug fit after insertion thereof.

5. A building construction as defined in claim 1 in which the juncture of said leg members with said base portion of the U-shaped bracket is offset inwardly whereby the outer edges of said base portion are even with the outer sides of said base member when said U-shaped bracket is connected to said base member.

6. A building construction comprising an elongated base member having longitudinally extending grooves therein, a generally U-shaped bracket having a base portion connected to leg members, said leg members being of a size and shape to telescope into said longitudinally extending grooves in said base member, an elongated bead, an extension on said base portion of said U-shaped bracket having a cross sectional shape corresponding generally to the shape of one side of said bead whereby said one side of the bead is in engagement with said extension, and inwardly extending retaining members carried by said extension in position to engage the other side of said bead whereby said bead is attached to said extension.

7. A building construction comprising an elongated base member having spaced side members with inturned flanges along the edges thereof defining longitudinally extending grooves in said base member, a generally U-shaped bracket having a base portion connected to laterally extending leg members, said leg members being of a size and shape to telescope into said longitudinally extending grooves in the base member, an elongated bead, the cross sectional shape of said base portion of the U-shaped bracket corresponding generally to the shape of one side of the bead whereby said one side of the bead is in engagement with said base portion, and inwardly extending retaining members carried by said U-shaped bracket in position to engage the other side of said bead whereby the bead is attached to said U-shaped bracket.

References Cited in the file of this patent

UNITED STATES PATENTS

| 1,728,461 | Wolcott | Sept. 17, 1929 |
| 2,023,604 | Lovejoy | Dec. 10, 1935 |

FOREIGN PATENTS

| 403,218 | Great Britain | Dec. 21, 1933 |